United States Patent
Panchal et al.

(10) Patent No.: US 10,932,123 B2
(45) Date of Patent: Feb. 23, 2021

(54) SYSTEMS AND METHODS FOR TEMPORARY WIRELESS DATA SERVICE

(71) Applicant: Verizon Patent and Licensing Inc., Arlington, VA (US)

(72) Inventors: Jignesh S. Panchal, Hillsborough, NJ (US); Michael Kondratiuk, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 15 days.

(21) Appl. No.: 16/365,335

(22) Filed: Mar. 26, 2019

(65) Prior Publication Data

US 2020/0314628 A1 Oct. 1, 2020

(51) Int. Cl.
*H04W 8/18* (2009.01)
*H04W 48/08* (2009.01)
*H04L 12/24* (2006.01)
*H04W 12/06* (2009.01)
*H04W 8/24* (2009.01)

(52) U.S. Cl.
CPC ........ *H04W 8/183* (2013.01); *H04L 41/5054* (2013.01); *H04W 8/24* (2013.01); *H04W 12/06* (2013.01); *H04W 48/08* (2013.01)

(58) Field of Classification Search
None
See application file for complete search history.

(56) References Cited

U.S. PATENT DOCUMENTS

| | | | |
|---|---|---|---|
| 10,194,313 B1* | 1/2019 | Karimli | H04W 12/06 |
| 2009/0088134 A1* | 4/2009 | Ishii | H04W 12/1008 |
| | | | 455/411 |
| 2010/0130169 A1* | 5/2010 | Narayanaswamy | H04L 65/40 |
| | | | 455/411 |
| 2014/0099916 A1* | 4/2014 | Mallikarjunan | H04M 15/52 |
| | | | 455/406 |
| 2014/0235239 A1* | 8/2014 | Kotecha | H04W 4/50 |
| | | | 455/435.1 |
| 2014/0245395 A1* | 8/2014 | Hulse | H04L 63/101 |
| | | | 726/4 |
| 2015/0146707 A1* | 5/2015 | Jung | H04L 63/0853 |
| | | | 370/338 |
| 2015/0181503 A1* | 6/2015 | Nasir | H04W 48/02 |
| | | | 455/411 |
| 2018/0176765 A1* | 6/2018 | Bharadwaj | H04W 68/02 |
| 2019/0028884 A1* | 1/2019 | Namiranian | H04W 4/24 |
| 2019/0053040 A1* | 2/2019 | Long | H04W 8/183 |

(Continued)

*Primary Examiner* — Jay L Vogel

(57) ABSTRACT

A service provider server may receive a request for temporary wireless data service for a user device. The service provider server may determine user information associated with a user account of the user device based on the request for the temporary wireless data service. The service provider server may generate a profile for the temporary wireless data service based on the user information associated with the user account. The service provider server may provide provisioning information based on the profile for the temporary wireless data service to the user device to activate access to the temporary wireless data service. The service provider server may authenticate, after providing the provisioning information, the user device for use of the temporary wireless data service based on the provisioning information and the profile.

20 Claims, 6 Drawing Sheets

(56) References Cited

U.S. PATENT DOCUMENTS

| | | | |
|---|---|---|---|
| 2019/0098487 A1* | 3/2019 | Boettger | H04W 76/15 |
| 2019/0208405 A1* | 7/2019 | Park | H04W 88/18 |
| 2019/0268384 A1* | 8/2019 | Hu | H04L 47/20 |

* cited by examiner

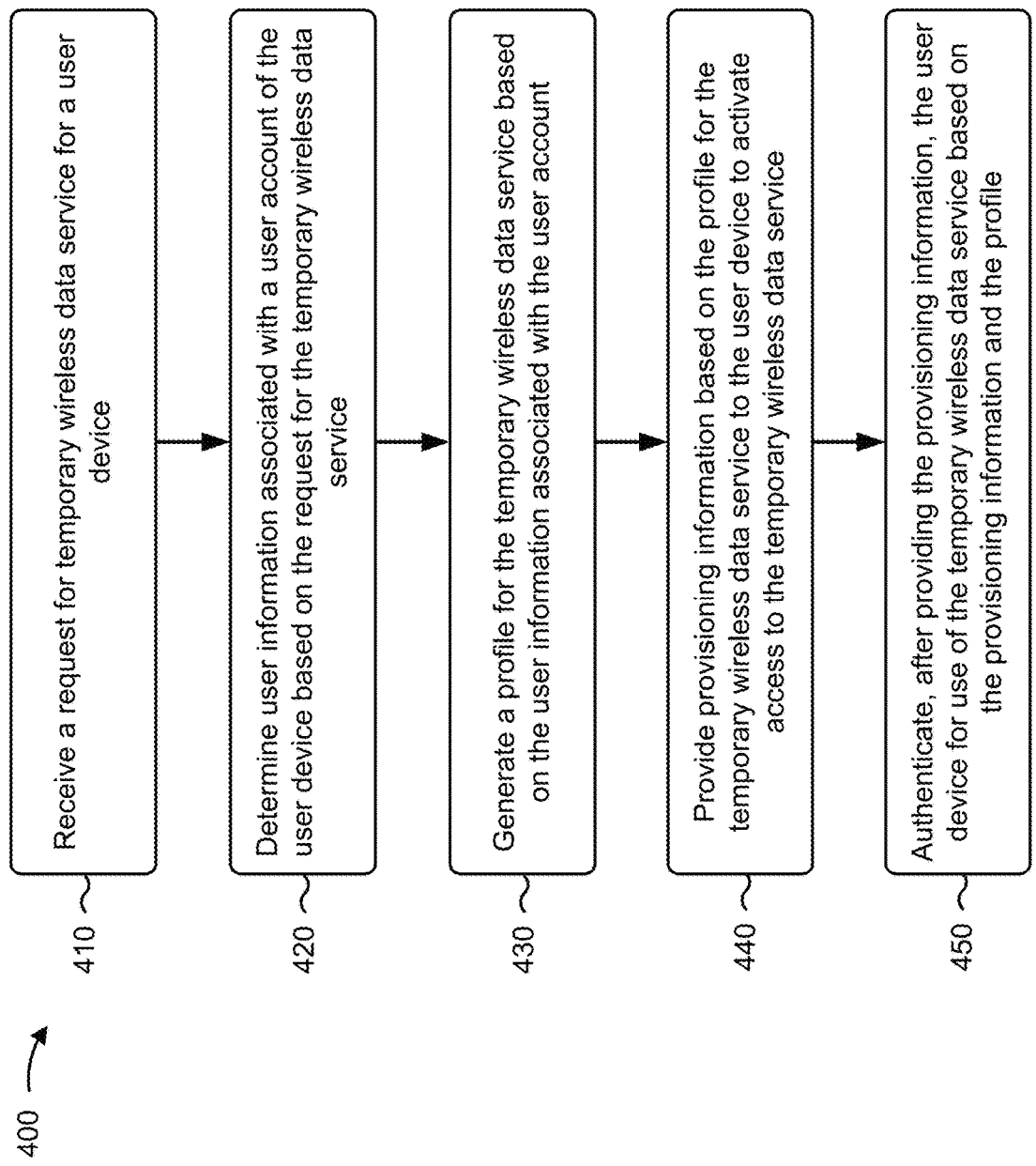

SYSTEMS AND METHODS FOR TEMPORARY WIRELESS DATA SERVICE

BACKGROUND

A user device may access a home network of a home service provider to provide communications functions to a user. For example, the user device may connect to the home network to access data service, voice service, and/or the like. When the user device is outside of a coverage area of the home service provider and the home network thereof, the user device may roam onto another network (roaming network) of another service provider (roaming service provider). For example, the user device may use a subscriber identity module (SIM) or an electronic SIM (eSIM) to identify the user device to enable the user device to access the roaming network of the roaming service provider. Alternatively, when a user device is inside a coverage area of the home service provider and the home network thereof, the user device may connect to the home network using the SIM or eSIM. Access to the home network and the roaming network may be subject to a service agreement between the user and the home service provider, between the home service provider and the roaming service provider, and/or the like. For example, the home service provider may, in accordance with a service agreement, agree to provide a particular level of download bandwidth, upload bandwidth, and/or the like to the user device when the user device is using the home network, a roaming network, and/or the like.

BRIEF DESCRIPTION OF THE DRAWINGS

FIG. 4 is a flow chart of an example process for providing temporary wireless data service.

DETAILED DESCRIPTION OF PREFERRED EMBODIMENTS

Figure 1A:
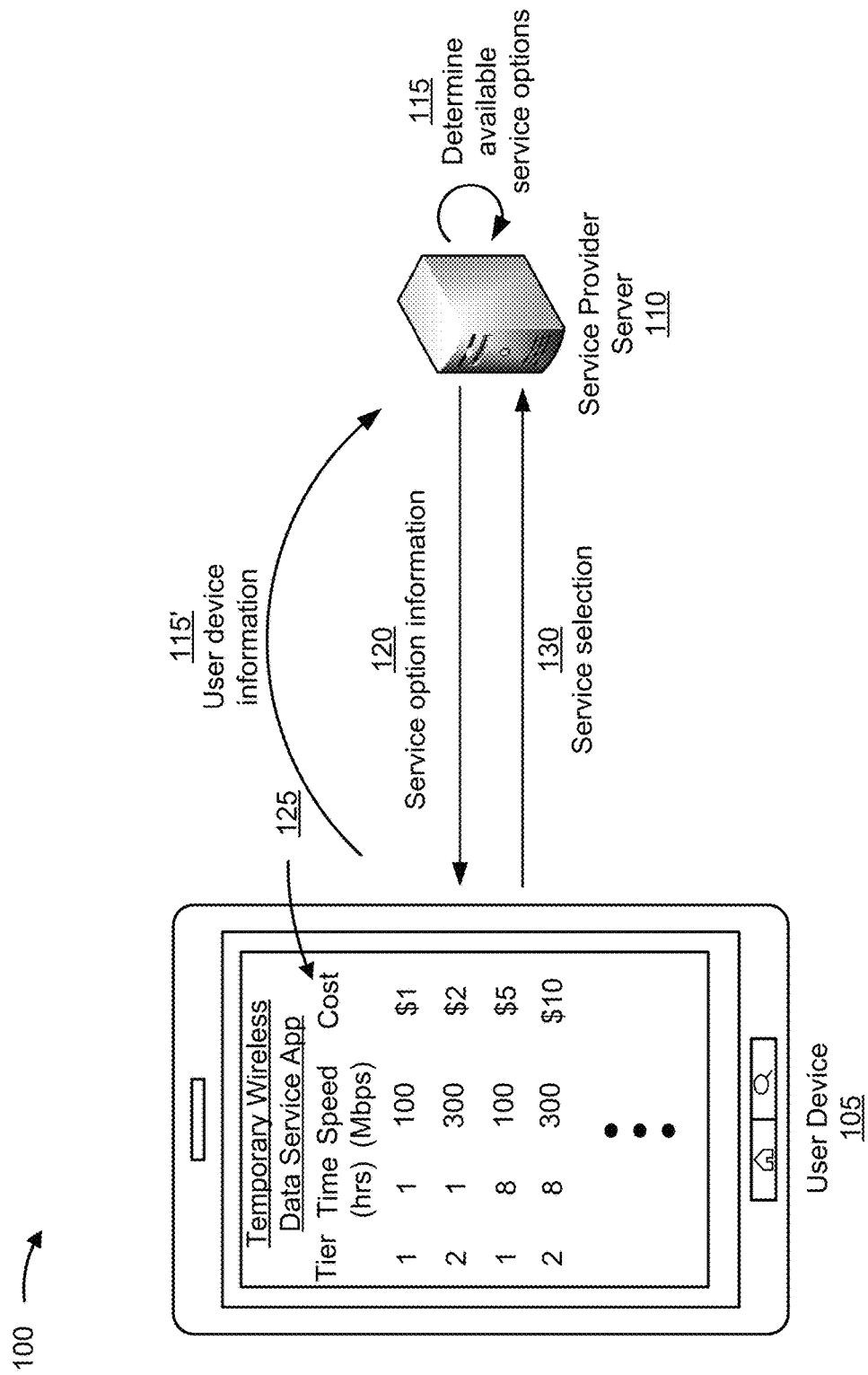
FIGS. 1A-1C are diagrams of an example implementation described herein.

The following detailed description of example implementations refers to the accompanying drawings. The same reference numbers in different drawings may identify the same or similar elements.

A user device may access a home network in accordance with a service agreement with a home service provider and may have access to one or more roaming networks based on the home service provider having roaming agreements with one or more roaming service providers. Such service agreements may be agreed to at a time when a user device first acquires service and may specify one or more parameters associated with network access. For example, when a user purchases a user device, the user may sign a service agreement that specifies a particular minimum upload data speed, a particular minimum download data speed, and/or the like.

However, periodically a user device may need a greater data speed on a home network than what is provided under a service agreement. Additionally, or alternatively, a user device may need to acquire a greater data speed on a roaming network than what is provided under a service agreement. Additionally, or alternatively, a user device may be associated with a home service provider that lacks an agreement for coverage in a network provided by another service provider (i.e., the home service provider lacks a roaming service agreement with a particular roaming service provider) and may need to acquire access to the network provided by the other service provider.

Some implementations described herein provide dynamic provisioning of temporary wireless data service for user devices. For example, a user device may use a mobile application (e.g., a temporary wireless data service application) provided by a service provider or downloadable from an application provider (e.g., an app store) to temporarily request and receive wireless data service on a network provided by the service provider, even without a prior service agreement with the service provider. In this case, the user device may select one or more parameters for the temporary wireless data service, such as a duration, a data speed, and/or the like, thereby enabling greater flexibility for the user device in using a home wireless network, a roaming wireless network, a wireless network for which the user device lacks access to a roaming service agreement, and/or the like. In this way, some implementations provide increased network access capabilities and reduce a likelihood that a user device lacks access to a network. Moreover, based on providing the one or more parameters for temporary wireless data service for selection based on a capability of the user device, some implementations described herein improve utilization of network resources by reducing a likelihood that network resources are allocated for a user device that cannot fully use the network resources that are allocated. Further, some implementations described herein enable improved network resource allocation by enabling dynamic pricing, dynamic parameter setting, and/or the like, thereby enabling dynamic demand management for a wireless network.

Figure 1B:
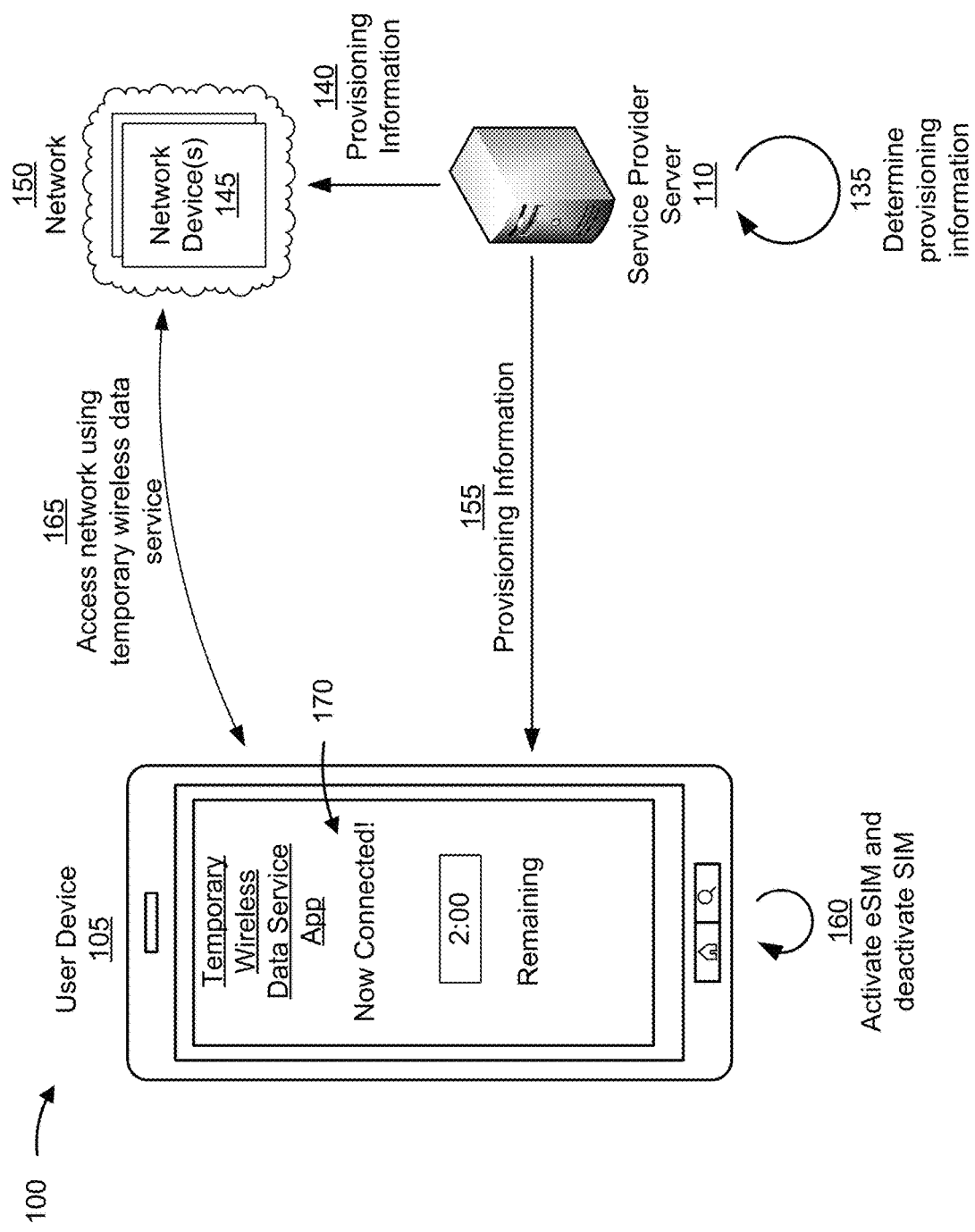
Figure 1C:
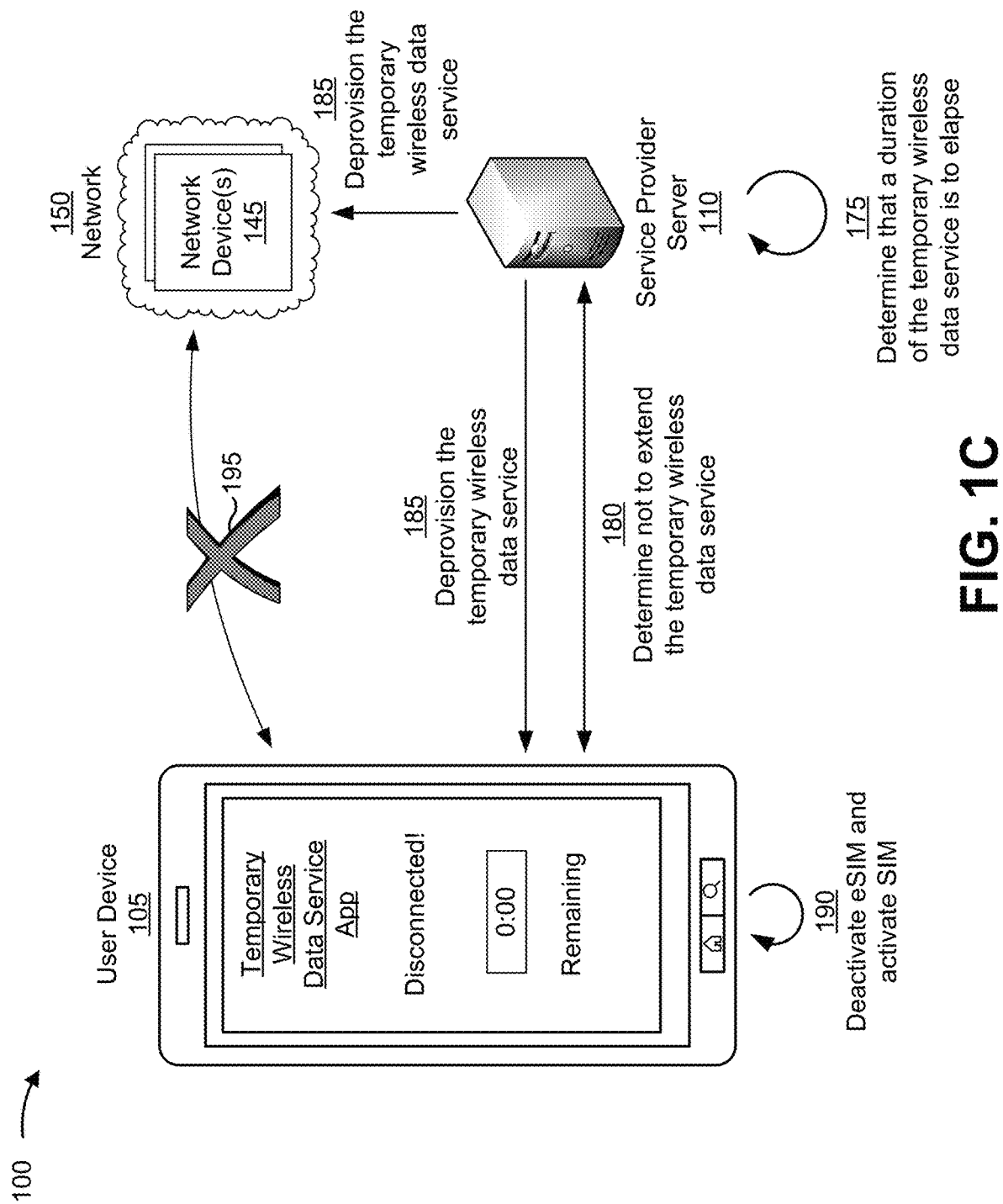

FIGS. 1A-1C are diagrams of an example implementation 100 described herein. As shown in FIG. 1A, example implementation 100 includes a user device 105 and a service provider server 110.

As further shown in FIG. 1A, and by reference numbers 115 and 115', service provider server 110 may determine available service options, such as based on user device information identifying a capability of user device 105, a measurement performed by user device 105, a user profile associated with user device 105, and/or the like. For example, service provider server 110 may determine that, for user device 105, one or more tiers of service are available. In some implementations, service provider server 110 may determine a set of tiers of service based on a characteristic of a network on which a temporary wireless data service is to be provided. For example, service provider server 110 may determine a level of network congestion on the network, a quantity of user devices using the network, a data throughput on the network, an available bandwidth of the network, and/or the like and may determine the set of tiers based on an availability of allocatable resources of the network.

Additionally, or alternatively, service provider server 110 may determine a set of tiers of service based on a characteristic of user device 105. For example, service provider server 110 and user device 105 may communicate to enable service provider server 110 to receive a user device capability indication (e.g., a capability parameter, such as a type of user device 105, a maximum data rate of user device 105, and/or the like), a network characteristic measured by user device 105 (e.g., a signal strength, a reference signal received power (RSRP), a reference signal received quality (RSRQ), a bit error rate, and/or the like), and/or the like. In this case, service provider server 110 may determine the set of tiers to limit a user device associated with less than a threshold signal strength to less than a threshold download speed, and may determine another set of tiers for a user device associated with greater than or equal to the threshold signal strength to receive greater than or equal to the threshold download speed. In this way, service provider server 110 may reduce a likelihood of user device 105 failing to receive, for example, a download speed indicated as being provided with a particular tier of service. Further, service provider server 110 may enable selection of modulation and coding schemes (MCSs) that achieve a particular indicated download speed under a particular signal strength condition.

In some implementations, service provider server 110 may determine a set of tiers of service based on location information. For example, service provider server 110 may offer a first set of tiers of service (e.g., with a first data speed, a first price, and/or the like) for a user device 105 operating at a first location or in a first network coverage area and may offer a second set of tiers of service (e.g., with a second data speed, a second price, and/or the like) for a user device 105 operating at a second location or in a second network coverage area. Additionally, or alternatively, service provider server 110 may provide a first set of tiers of service to a first type of user (e.g., a user without an ongoing service plan) and a second set of tiers of service to a second type of user (e.g., a user with an ongoing service plan). Although some implementations described herein are described in terms of data service, implementations described herein may be used for voice service, broadcast service, multicast service, and/or the like.

As further shown in FIG. 1A, and by reference number 120, service provider server 110 may provide service option information to identify one or more parameters of the network to which user device 105 is to connect to obtain temporary wireless data service. For example, as shown by reference number 125, service provider server 110 may provide information identifying a tier of service, a duration for use of the tier of service, a speed provided by the tier of service, a cost associated with obtaining the temporary wireless data service with the tier of service, and/or the like. In some implementations, the duration may be a time duration. For example, service provider server 110 may provide information indicating that a particular tier of service is available for a particular time duration at a particular price. Additionally, or alternatively, service provider server 110 may provide information indicating that a particular tier of service is available for a particular usage (e.g., a particular amount of data download) at a particular price. In this case, service provider server 110 may monitor data usage, network utilization, and/or the like, may determine that data usage, network utilization (e.g., associated with utilization of the temporary wireless data service), and/or the like using the temporary wireless data service satisfies a threshold, and may determine that the duration is elapsed when the data usage, network utilization, and/or the like satisfies the threshold. Additionally, or alternatively, service provider server 110 may provide information indicating that a particular tier of service is available for a particular type of usage, such as for Voice over Internet Protocol (VoIP) communications, streaming video services, streaming gaming services, AR/VR services, routing services, and/or the like.

Additionally, or alternatively, service provider server 110 may provide information identifying a type of network on which the temporary wireless data service is provided, such as a fourth generation/long term evolution (4G/LTE) network, a fifth generation/New Radio (5G/NR) network, and/or the like. Although some implementations are described herein in terms of a particular set of network parameters for each tier, other types of network parameters and/or tiers may be used.

In some implementations, user device 105 may provide, via a user interface, a mobile application with which to access the temporary wireless data service. For example, user device 105 may include a mobile application that receives information identifying tiers of service from service provider server 110 and enables a user of user device 105 to request temporary wireless data service with a particular tier of service. In some implementations, user device 105 may communicate with an application server (e.g., via a default wireless data service) to download the mobile application to enable a user of user device 105 to request access to the temporary wireless data service. In some implementations, user device 105 may obtain payment information for a user and may provide the payment information to the mobile application to authorize payment for a temporary wireless data service. For example, user device 105 may provide a user interface with which to receive payment information from a user. Additionally, or alternatively, user device 105 may obtain locally stored payment information for mobile application-based purchases, remote stored payment information associated with a user account for the user, and/or the like.

As further shown in FIG. 1A, and by reference number 130, service provider server 110 may receive a service selection from user device 105. For example, service provider server 110 may receive information identifying a particular tier of service that service provider server 110 is to provide for user device 105 as a temporary wireless data service. In some implementations, user device 105 may request to transfer between different networks. For example, user device 105 may request the temporary wireless data service with the particular tier of service to transfer from a first network on which user device 105 is in operation to a second, different network. Additionally, or alternatively, user device 105 may request the temporary wireless data service to transfer from a first tier of service on a network to a second, different tier of service on the same network. In some implementations, service provider server 110 may receive information associated with authenticating user device 105 to request the particular tier of service. For example, service provider server 110 may receive information identifying a user of user device 105, a billing account of the user, a username and a password, and/or the like.

As shown in FIG. 1B, and by reference number 135, service provider server 110 may determine provisioning information for providing temporary wireless data service to user device 105. For example, service provider server 110 may create a temporary user account and/or a temporary user profile associated with the temporary user account for a user of user device 105. In this case, service provider server 110 may store credentials for accessing the user account, user payment information for the user, service parameters for the temporary wireless data service, and/or the like. For example, service provider server 110 may store information identifying a data speed, an aggregated maximum bit rate (AMBR), a quality of service (QoS) profile, a network slice, and/or the like that user device 105 is to receive when accessing the temporary wireless data service. In this case, service provider server 110 may determine, for a network slice that is to be provided for user device 105, a QoS flow, a transport priority, an over-the-air (OTA) radio access network (RAN) scheduler priority, a service level agreement (SLA), and/or the like. In some implementations, service provider server 110 may determine a temporary wireless data service agreement for user device 105. For example, service provider server 110 may generate the service agreement to indicate that a particular tier of service will be provided for a particular payment. In this case, service provider server 110 may subsequently automatically complete a transaction and may provide a transaction indication to user device 105 based on providing the particular tier of service and in accordance with the service agreement.

As further shown in FIG. 1B, and by reference number 140, service provider server 110 may provide the provisioning information to network devices 145 of network 150 to enable establishment of temporary wireless data service via network 150. For example, service provider server 110 may indicate, to network devices 145 a data speed, an AMBR, a QoS profile, a network slice, and/or the like that network 150 is to provide to user device 105. Additionally, or alternatively, service provider server 110 may provide provisioning information to authenticate user device 105 for access to network 150. For example, service provider server 110 may provide information identifying user device 105, to enable network devices 145 to determine that user device 105 is to be provided temporary wireless data service associated with a particular tier of service, a particular network slice, a particular QoS profile, and/or the like.

As further shown in FIG. 1B, and by reference number 155, service provider server 110 may provide the provisioning information to user device 105 to enable user device 105 to connect to network 150 and access the temporary wireless data service. For example, service provider server 110 may provide provisioning information linked to a profile for user device 105 identifying a user account, a data speed, and/or the like. In this case, service provider server 110 may provide the information to a mobile application of user device 105 that is associated with establishing the temporary wireless data service, to enable the mobile application to configure user device 105 and access network 150. In some implementations, user device 105 may perform an over-the-air provisioning and activation (OTAPA) procedure using the provisioning information to access network 150, as described herein. In some implementations, service provider server 110 may provide information identifying parameters for configuring an electronic subscriber identity module (eSIM), such as an identifier to use for user device 105 in the eSIM.

As further shown in FIG. 1B, and by reference number 160, user device 105 may activate an eSIM and deactivate a SIM to access network 150. For example, the mobile application of user device 105 associated with providing the temporary wireless data service may use the provisioning information to provision the eSIM. In this case, user device 105 may be enabled to use the eSIM to connect to network 150 rather than using the SIM to connect to network 150 or another network. In this way, user device 105 may access network 150 in accordance with the tier of service for which the temporary wireless data service is provisioned rather than accessing network 150 in accordance with a default wireless data service (e.g., a slower data speed wireless service that user device 105 is using). Additionally, or alternatively, user device 105 may activate access to network 150 using another technique, such as reconfiguring an eSIM, reconfiguring a SIM, performing a network acquisition procedure, and/or the like.

Additionally, or alternatively, user device 105 may receive the tier of service associated with the temporary wireless data service rather than accessing another network that user device 105 is using for a default wireless data service. In some implementations, user device 105 may activate the eSIM using an application programming interface (API). For example, user device 105 may expose an API of the eSIM to the mobile application to enable the mobile application to use the provisioning information to configure the eSIM to access network 150 in order to enable the temporary wireless data service.

As further shown in FIG. 1B, and by reference numbers 165 and 170, user device 105 may use the eSIM to access network 150 using the temporary wireless data service. For example, user device 105 may perform an over-the-air provisioning and activation procedure (OTAPA), may access network 150, may authenticate onto network 150 using the provisioning information, and may start using the temporary wireless data service. In this case, user device 105 may provide, via a user interface of the mobile application, information indicating that user device 105 is accessing the temporary wireless data service, information identifying a duration for which user device 105 may use the temporary wireless data service, and/or the like. In this case, based on the user seeing the user interface indication that the temporary wireless data service is available for use by user device 105, the user may use user device 105 to, for example, download information, receive routing guidance, stream video, play a game, experience a virtual world, and/or the like. In some implementations, one or more network devices 145 may communicate with service provider server 110 to determine that user device 105 is authenticated for the temporary wireless data service.

In some implementations, service provider server 110 may authorize a payment based on user device 105 successfully connecting to network 150. For example, after user device 105 connects to network 150, a network device 145 may transmit a notification to service provider server 110, which may cause a payment to be made relating to the temporary wireless data service, and may transmit a notification to user device 105 indicating the payment. In this case, user device 105 may provide an indication of the payment for display in the user interface of the mobile application. In some implementations, user device 105, network devices 145, and/or service provider server 110 may detect a connectivity failure. In this case, user device 105, network devices 145, and/or service provider server 110 may communicate to remedy the connectivity failure by generating new provisioning information, reconfiguring the eSIM, performing a new OTAPA procedure, and/or the like.

As shown in FIG. 1C, and by reference number 175, after a duration for the temporary wireless data service, service provider server 110 may determine that the duration of the temporary wireless data service is to elapse. For example, after a threshold period of time, service provider server 110 may determine that the duration of the temporary wireless data service is to elapse. Additionally, or alternatively, after a threshold usage of the temporary wireless data service has occurred (e.g., an allocated amount of data is downloaded), service provider server 110 may determine that the duration of the temporary wireless data service is to elapse. Additionally, or alternatively, after user device 105 has completed usage of a particular type of service associated with the temporary wireless data service (e.g., user device 105 has completed a VoIP call, a streaming video download, a route guidance, etc.), user device 105 and/or a network device 145 may provide an indication to service provider server 110 to indicate that the duration for the temporary wireless data service is elapsed.

As further shown in FIG. 1C, and by reference number 180, service provider server 110 may communicate with user device 105 to determine not to extend the temporary wireless data service. For example, service provider server 110 may provide an indication that the temporary wireless data service is to elapse and may query user device 105 as to whether to extend the temporary wireless data service. In this case, service provider server 110 may provide updated service information, and user device 105 may provide a user interface notification requesting that the user select to extend, alter, or end the temporary wireless data service. In some implementations, service provider server 110 may provide, via the user interface of the mobile application of user device 105, an option to extend a current temporary wireless data service, switch to a different tier of service for temporary wireless data service, end the temporary wireless data service, and/or the like. In this case, when user device 105 determines (e.g., based on user input) to extend or alter the temporary wireless data service, service provider server 110 may re-provision network devices 145 of network 150, may automatically charge an account of a user of user device 105, and/or the like to enable user device 105 to continue using the temporary wireless data service. Additionally, or alternatively, service provider server 110 may authorize another payment for extending the temporary wireless data service, may start a new timer or data download tracker for determining when a duration of the temporary wireless data service is to elapse, and/or the like. In some implementations, service provider server 110 may monitor usage of the temporary wireless data service and may automatically complete one or more transactions to enable payment for the usage of the temporary wireless data service.

In contrast, when user device 105 determines to end the temporary wireless network data service, service provider server 110 may deprovision the temporary wireless data service, as shown by reference number 185. For example, based on a result of determining whether to deactivate or extend the temporary wireless data service (e.g., based on a received indication received via a user interface of user device 105), service provider server 110 may transmit a command to user device 105 to deactivate the eSIM, erase the eSIM, reprovision the eSIM (e.g., for another network), and/or the like. Additionally, or alternatively, service provider server 110 may transmit information to network devices 145 to cause network devices 145 to cease allocating resources for the temporary wireless data service for user device 105. In some implementations, service provider server 110 may remove a user profile associated with user device 105 when ending the temporary wireless data service. For example, service provider server 110 may cause the user profile to be removed from a data structure storing user profiles associated with user devices accessing temporary wireless data service. Additionally, or alternatively, service provider server 110 may save the user profile in the data structure for use in a subsequent request for temporary wireless data service. In this case, service provider server 110 may determine to reactivate the temporary wireless data service and may use the stored user profile to authorize payment, determine a tier of service, and/or the like. In some implementations, service provider server 110 may store information identifying a preferred tier of service in order to reduce a subsequent utilization of network resources associated with identifying available tiers of service.

As further shown in FIG. 1C, and by reference numbers 190 and 195, user device 105 may deactivate the eSIM and activate the SIM to transfer from using the temporary wireless data service to using a default wireless data service associated with the SIM for network connectivity (or to return to not using a wireless data service). In this case, user device 105 may disconnect from network 150 or may resume using another tier of service of network 150 associated with the default wireless data service, and may provide, via the user interface of the mobile application, an indication that user device 105 is disconnected form the temporary wireless data service.

In this way, service provider server 110 and user device 105 enable access to a temporary wireless data service, thereby enabling user device 105 to obtain wireless data service when a default wireless data service is unavailable, and improving network availability for user device 105. Moreover, service provider server 110 and user device 105 may enable user device 105 to obtain a particular tier of service, as a temporary wireless data service, that may be different from a tier of service provided as a default wireless data service, thereby improving network performance for user device 105. Furthermore, based on dynamically determining tiers of service for user device 105, service provider server 110 enables improved utilization of network resources relative to over-allocating network resources for a user device lacking a capability of using the network resources, a user device operating in a network condition that prevents utilization of the network resources, and/or the like.

As indicated above, the implementation depicted in FIGS. 1A-1C is provided as an example. Other examples can differ from what is described with regard to FIGS. 1A-1C. The number and arrangement of devices and networks shown in FIGS. 1A-1C are provided as one or more examples. In practice, there may be additional devices and/or networks, fewer devices and/or networks, different devices and/or networks, or differently arranged devices and/or networks than those shown in FIGS. 1A-1C.

Figure 2:
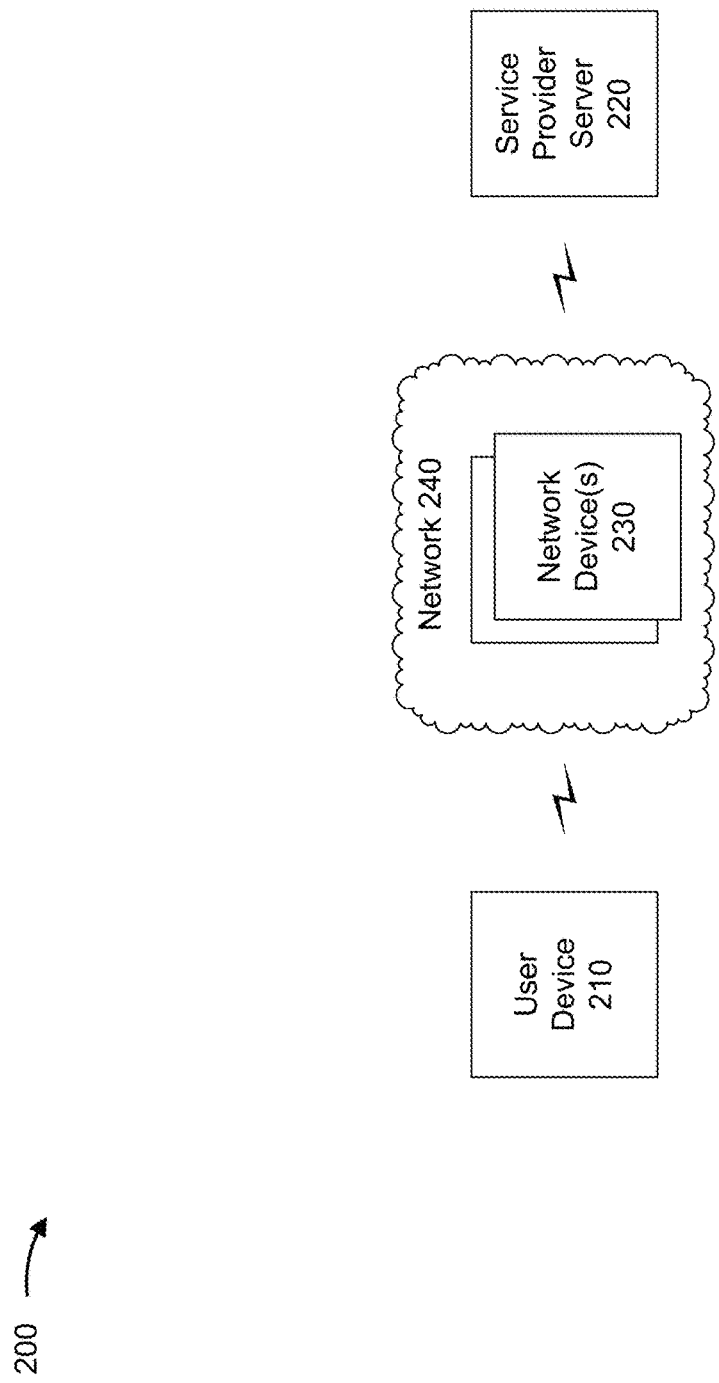
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a service provider server 220, a network device 230, and a network 240. Devices of environment 200 may interconnect via wired connections, wireless connections, or a combination of wired and wireless connections.

User device 210 includes one or more devices capable of receiving, generating, storing, processing, and/or providing information associated with accessing a temporary wireless data service of a network. For example, user device 210 may include a communication and/or computing device, such as a mobile phone (e.g., a smart phone, a radiotelephone, etc.), a computer (e.g., a laptop computer, a tablet computer, a handheld computer, etc.), a gaming device, a wearable communication device (e.g., a smart wristwatch, a pair of smart eyeglasses, etc.), or a similar type of device.

Service provider server 220 includes one or more devices capable of receiving, generating, storing, processing, and/or providing information associated with enabling access to a temporary wireless data service of a network. For example, service provider server 220 may include a server internal to or external to a provider network that may manage authorization and provisioning of temporary wireless data service for the provider network. In some implementations, service provider server 220 may communicate with user device 210 to cause a mobile application to provide information associated with the temporary wireless data service.

Network device 230 includes one or more devices associated with providing a temporary wireless data service to user device 210. For example, network device 230 may include a firewall, a router, a gateway, a switch, a hub, a bridge, a reverse proxy, a server (e.g., a proxy server), a security device, an intrusion detection device, a load balancer, or a similar device. Additionally, or alternatively, network device 230 may include a base station, a mobility management entity (MME), a serving gateway (SGW), a packet data network gateway (PGW), a policy and charging rules function (PCRF), an operations support system/business support systems (OSS/BSS), a service capability exposure function (SCEF), a home subscriber server (HSS), an authentication, authorization, and accounting (AAA) server, and/or the like.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
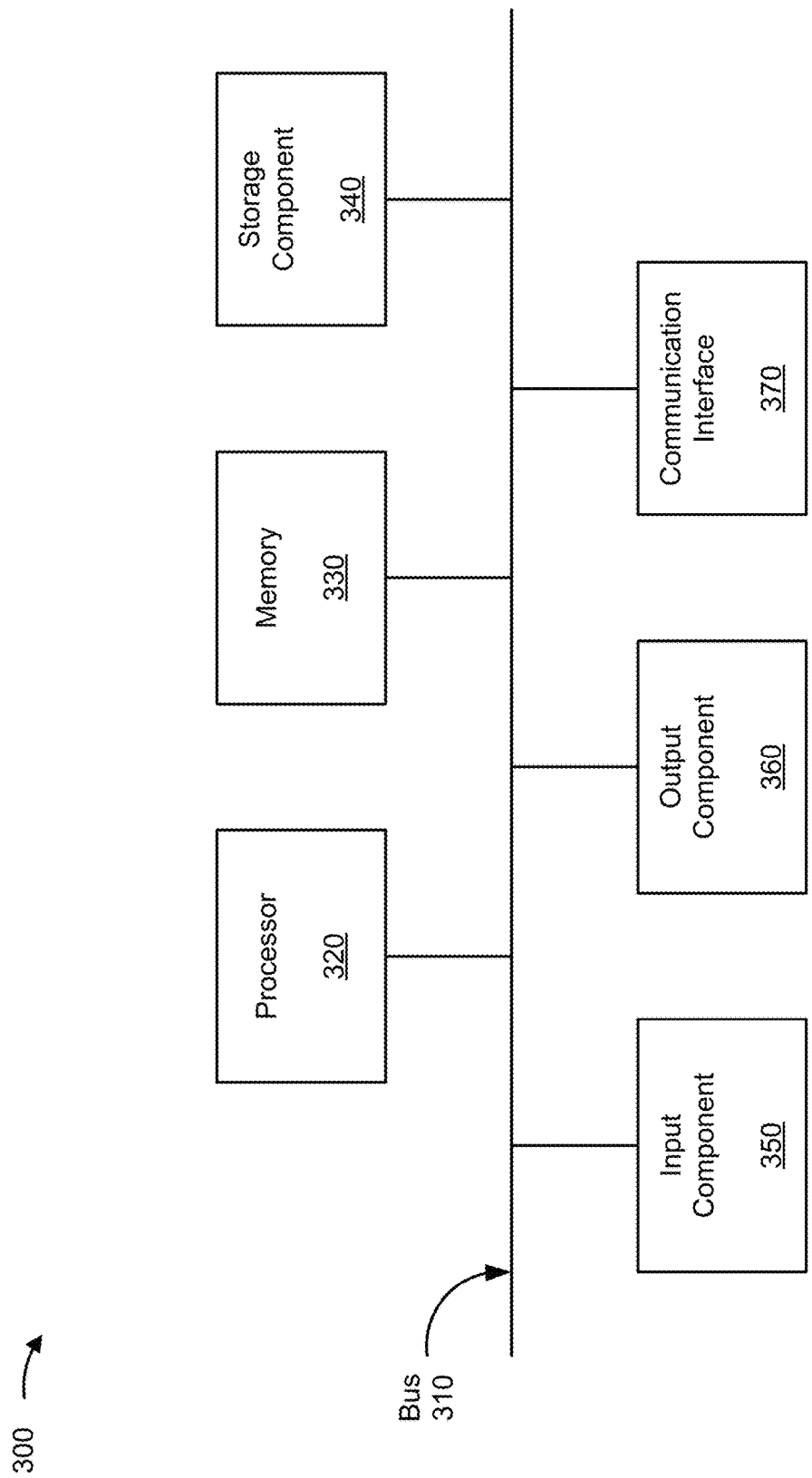
FIG. 3 is a diagram of example components of one or more devices of FIG. 2.

FIG. 3 is a diagram of example components of a device 300. Device 300 may correspond to user device 210, service provider server 220, and/or network device 230. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for systems and methods for temporary wireless data service. In some implementations, one or more process blocks of FIG. 4 may be performed by service provider server (e.g., service provider server 220). In some implementations, one or more process blocks of FIG. 4 may be performed by another device or a group of devices separate from or including the service provider server, such as a user device (e.g., user device 210), a network device (e.g., network device 230), and/or the like.

As shown in FIG. 4, process 400 may include receiving a request for temporary wireless data service for a user device (block 410). For example, the service provider server (e.g., using processor 320, memory 330, storage component 340, input component 350, output component 360, communication interface 370 and/or the like) may receive a request for temporary wireless data service for a user device, as described above. In some implementations, the temporary wireless data service may be associated with one or more characteristics. For example, the temporary wireless data service may be based on a location of the user device, a capability of the user device, a network capability of a network, a signal strength, a payment tier, and/or the like. In some implementations, the service provider server may receive the request from a mobile application of the user device. In some implementations, the service provider server may receive the request based on identifying one of more tiers of service and providing an indication of the one or more tiers of service to the user device for selection. For example, the service provider server may receive user information identifying a user device capability, a user account, and/or the like, may provide information identifying a set of tiers of wireless service, and may receive a request as a response.

As further shown in FIG. 4, process 400 may include determining user information associated with a user account of the user device based on the request for the temporary wireless data service (block 420). For example, the service provider server (e.g., using processor 320, memory 330, storage component 340, input component 350, output component 360, communication interface 370 and/or the like) may determine user information associated with a user account of the user device based on the request for the temporary wireless data service, as described above. In some implementations, the service provider server may determine, based on the request, a user device capability, a user account, a selected tier of service, and/or the like.

As further shown in FIG. 4, process 400 may include generating a profile for the temporary wireless data service based on the user information associated with the user account (block 430). For example, the service provider server (e.g., using processor 320, memory 330, storage component 340, input component 350, output component 360, communication interface 370 and/or the like) may generate a profile for the temporary wireless data service based on the user information associated with the user account, as described above. In some implementations, the service provider server may store the temporary profile for use in authenticating the user device for use of the temporary wireless data service. For example, the service provider server may determine and store information identifying a temporary credential, an aggregated maximum bit rate, a network slice identifier, a QoS profile, and/or the like for the user device.

As further shown in FIG. 4, process 400 may include providing provisioning information based on the profile for the temporary wireless data service to the user device to activate access to the temporary wireless data service (block 440). For example, the service provider server (e.g., using processor 320, memory 330, storage component 340, input component 350, output component 360, communication interface 370 and/or the like) may provide provisioning information based on the profile for the temporary wireless data service to the user device to activate an electronic subscriber identity module (eSIM) to provide access to the temporary wireless data service, as described above. In some implementations, the service provider server may provide the provisioning information to the user device to configure the eSIM. For example, the service provider server may provide information identifying an identifier that the eSIM is to user to access the temporary wireless data service. Additionally, or alternatively, the service provider server may provide provisioning information to one or more network devices to configure the one or more network devices to enable the user device to access the temporary wireless data service.

As further shown in FIG. 4, process 400 may include authenticating, after providing the provisioning information, the user device for use of the temporary wireless data service based on the provisioning information and the profile (block 450). For example, the service provider server (e.g., using processor 320, memory 330, storage component 340, input component 350, output component 360, communication interface 370 and/or the like) may authenticate, after providing the provisioning information, the user device for use of the temporary wireless data service based on the provisioning information and the profile, as described above. In some implementations, the service provider server may provide access to a network associated with the temporary wireless data service based on authenticating the user device for use of the temporary wireless data service. In this case, the service provider server may monitor the network to determine a user utilization of the network, may automatically complete a transaction based on the user utilization, may automatically determine that a usage duration is elapsed, may automatically end access to the temporary wireless data service, and/or the like.

Process 400 may include additional implementations, such as any single implementation or any combination of implementations described herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   transmit a request for temporary wireless data service,
      wherein the request for the temporary wireless data service includes information indicating a tier from a plurality of tiers associated with a network associated with the temporary wireless data service, separate from a default service for the device, based on one or more device capabilities,
         wherein the tier indicates at least:
            a duration of use of the temporary wireless data service, and
            different parameters for devices with different indicated device capabilities;
   receive, as a response to the request for the temporary wireless data service, provisioning information linked to a profile for the temporary wireless data service;
   provision an electronic subscriber identity module (eSIM) based on the provisioning information;
   activate the eSIM and deactivate a subscriber identity module (SIM) based on provisioning the eSIM;
   authenticate, based on activating the eSIM and deactivating the SIM, the eSIM for the temporary wireless data service using a network associated with the temporary wireless data service;
   access the network using the temporary wireless data service based on authenticating the eSIM;
   determine, after a period of time associated with a temporary wireless data service agreement for the temporary wireless data service, to end the temporary wireless data service,
      wherein the period of time is associated with the duration of use;
   deactivate the eSIM and activate the SIM based on determining to end the temporary wireless data service,
      wherein the SIM is associated with accessing the default service; and
   transfer to using the SIM for network connectivity based on deactivating the eSIM and activating the SIM.

2. The device of claim 1, wherein the one or more processors are further to:
   provide a user interface indication that the temporary wireless data service is available for use based on authenticating the eSIM for the temporary wireless data service.

3. The device of claim 1, wherein the request for the temporary wireless data service includes user payment information associated with authorizing payment for the temporary wireless data service.

4. The device of claim 1, wherein the request for the temporary wireless data service includes a device capability indication to indicate one or more capability parameters of the device for using the temporary wireless data service.

5. The device of claim 1, wherein the one or more processors, when authenticating the eSIM for the temporary wireless data service, are to:
   authenticate the eSIM for the temporary wireless data service using a stored temporary wireless data service application.

6. The device of claim 1, wherein the one or more processors are further to:
   receive a transaction indication indicating a network utilization associated with utilization of the temporary wireless data service by the device.

7. The device of claim 1, wherein the one or more processors are further to:
   transfer from using a default wireless data service associated with the SIM to using the temporary wireless data service associated with the eSIM to access the network based on authenticating the eSIM.

8. The device of claim 1, wherein the one or more processors are further to:
- determine to end use of the temporary wireless data service;
- erase the eSIM and activate the SIM based on determining to end the use of the temporary wireless data service; and
- transfer from using the temporary wireless data service associated with the eSIM to using a default wireless data service associated with the SIM.

9. A non-transitory computer-readable medium storing instructions, the instructions comprising:
- one or more instructions that, when executed by one or more processors of a device, cause the one or more processors to:
  - transmit a request for temporary wireless data service,
    - wherein the request for the temporary wireless data service includes information indicating a tier from a plurality of tiers associated with a network associated with the temporary wireless data service, separate from a default service for the device, based on one or more device capabilities,
    - wherein the tier indicates at least:
      - a duration of use of the temporary wireless data service, and
      - different parameters for devices with different indicated device capabilities;
  - receive, as a response to the request for the temporary wireless data service, provisioning information linked to a profile for the temporary wireless data service;
  - provision an electronic subscriber identity module (eSIM) based on the provisioning information;
  - activate the eSIM and deactivate a subscriber identity module (SIM) based on provisioning the eSIM;
  - authenticate, based on activating the eSIM and deactivating the SIM, the eSIM for the temporary wireless data service using a network associated with the temporary wireless data service;
  - access the network using the temporary wireless data service based on authenticating the eSIM;
  - determine, after a period of time associated with a temporary wireless data service agreement for the temporary wireless data service, to end the temporary wireless data service,
    - wherein the period of time is associated with the duration of use;
  - deactivate the eSIM and activate the SIM based on determining to end the temporary wireless data service,
    - wherein the SIM is associated with accessing the default service; and
  - transfer to using the SIM for network connectivity based on deactivating the eSIM and activating the SIM.

10. The non-transitory computer-readable medium of claim 9, wherein the eSIM and the SIM are associated with a same network.

11. The non-transitory computer-readable medium of claim 9, wherein the eSIM and the SIM are associated with different networks.

12. The non-transitory computer-readable medium of claim 9, wherein the one or more instructions, when executed by the one or more processors, further cause the one or more processors to:
- determine to reactivate the temporary wireless data service; and
- use the profile for the temporary wireless data service based on determining to reactivate the temporary wireless data service,
  - wherein the profile is saved after ending the temporary wireless data service.

13. The non-transitory computer-readable medium of claim 9, wherein one or more characteristics of the temporary wireless data service are related to at least one of:
- a location of the device,
- a capability of the device,
- a network capability,
- a signal strength, or
- a payment tier.

14. A method, comprising:
- transmitting, by a device, a request for temporary wireless data service,
  - wherein the request for the temporary wireless data service includes information indicating a tier from a plurality of tiers associated with a network associated with the temporary wireless data service, separate from a default service for the device, based on one or more device capabilities, and
  - wherein the tier indicates at least:
    - a duration of use of the temporary wireless data service, and
    - different parameters for devices with different indicated device capabilities;
- receiving, by a device, as a response to the request for the temporary wireless data service, provisioning information linked to a profile for the temporary wireless data service;
- provisioning, by a device, an electronic subscriber identity module (eSIM) based on the provisioning information;
- activating, by a device, the eSIM and deactivate a subscriber identity module (SIM) based on provisioning the eSIM;
- authenticating, by a device, based on activating the eSIM and deactivating the SIM, the eSIM for the temporary wireless data service using a network associated with the temporary wireless data service;
- accessing, by a device, the network using the temporary wireless data service based on authenticating the eSIM;
- determining, by a device, after a period of time associated with a temporary wireless data service agreement for the temporary wireless data service, to end the temporary wireless data service,
  - wherein the period of time is associated with the duration of use;
- deactivating, by a device, the eSIM and activate the SIM based on determining to end the temporary wireless data service,
  - wherein the SIM is associated with accessing the default service; and
- transferring, by a device, to using the SIM for network connectivity based on deactivating the eSIM and activating the SIM.

15. The method of claim 14, wherein the eSIM and the SIM are associated with a same network.

16. The method of claim 14, wherein the eSIM and the SIM are associated with different networks.

17. The method of claim 14, further comprising:
- determining to reactivate the temporary wireless data service; and
- using the profile for the temporary wireless data service based on determining to reactivate the temporary wireless data service, wherein the profile is saved after ending the temporary wireless data service.

18. The method of claim 14, wherein one or more characteristics of the temporary wireless data service are related to at least one of:
- a location of the device,
- a capability of the device,
- a network capability,
- a signal strength, or
- a payment tier.

19. The method of claim 14, further comprising:
- determining to end use of the temporary wireless data service;
- erasing the eSIM and activate the SIM based on determining to end the use of the temporary wireless data service; and
- transferring from using the temporary wireless data service associated with the eSIM to using a default wireless data service associated with the SIM.

20. The method of claim 14, further comprising:
- transferring from using a default wireless data service associated with the SIM to using the temporary wireless data service associated with the eSIM to access the network based on authenticating the eSIM.

* * * * *